US009170701B2

(12) United States Patent
Barak et al.

(10) Patent No.: US 9,170,701 B2
(45) Date of Patent: Oct. 27, 2015

(54) SUGGESTING CONTEXTUALLY-RELEVANT CONTENT OBJECTS

(75) Inventors: Nimrod Barak, Tel Aviv (IL); Nir Benjamin, Pardes-Hana-Karkur (IL)

(73) Assignee: SAP Portals Israel Ltd, Ra'anana (IL)

( * ) Notice: Subject to any disclaimer, the term of this patent is extended or adjusted under 35 U.S.C. 154(b) by 27 days.

(21) Appl. No.: 13/438,990

(22) Filed: Apr. 4, 2012

(65) Prior Publication Data
US 2013/0268889 A1 Oct. 10, 2013

(51) Int. Cl.
G06F 3/048 (2013.01)
G06F 3/0482 (2013.01)
G06F 17/30 (2006.01)
G06Q 10/06 (2012.01)

(52) U.S. Cl.
CPC .............. G06F 3/048 (2013.01); G06F 3/0482 (2013.01); G06F 17/30873 (2013.01); *G06Q 10/06* (2013.01)

(58) Field of Classification Search
CPC ............ G06F 17/30383; G06F 3/0482; G06F 17/30873; G06Q 10/06
USPC ........................................................ 715/825
See application file for complete search history.

(56) References Cited

U.S. PATENT DOCUMENTS

| 5,960,437 | A  | * | 9/1999  | Krawchuk et al. ............ 707/702 |
| 6,141,731 | A  | * | 10/2000 | Beardsley et al. ............ 711/136 |
| 6,424,979 | B1 | * | 7/2002  | Livingston et al. ........... 715/206 |
| 7,171,619 | B1 | * | 1/2007  | Bianco ........................... 715/206 |
| 7,797,635 | B1 | * | 9/2010  | Denise ........................... 715/738 |
| 7,984,417 | B2 |   | 7/2011  | Ben-Zvi et al. |
| 8,489,561 | B1 |   | 7/2013  | Nathan et al. |
| 8,554,776 | B1 |   | 10/2013 | Barak et al. |
| 8,566,330 | B1 |   | 10/2013 | Barak et al. |
| 8,661,328 | B2 |   | 2/2014  | Barak et al. |
| 8,756,292 | B2 |   | 6/2014  | Lehmann et al. |
| 8,862,597 | B2 |   | 10/2014 | Barak et al. |
| 8,875,060 | B2 |   | 10/2014 | Barak et al. |
| 8,907,927 | B2 |   | 12/2014 | Barak et al. |
| 8,938,726 | B2 |   | 1/2015  | Barak |
| 8,965,987 | B2 |   | 2/2015  | Lehmann et al. |
| 2005/0108396 | A1 | * | 5/2005  | Bittner ........................... 709/225 |
| 2006/0218503 | A1 | * | 9/2006  | Matthews et al. ............. 715/779 |
| 2007/0094609 | A1 | * | 4/2007  | Gilboa et al. ................. 715/762 |
| 2007/0113188 | A1 | * | 5/2007  | Bales et al. ................... 715/742 |
| 2007/0250784 | A1 | * | 10/2007 | Riley et al. .................... 715/764 |
| 2009/0198699 | A1 | * | 8/2009  | Acedo et al. .................... 707/10 |
| 2010/0185973 | A1 | * | 7/2010  | Ali et al. ........................ 715/781 |
| 2011/0276925 | A1 | * | 11/2011 | Tumanov et al. ............. 715/856 |
| 2012/0102050 | A1 | * | 4/2012  | Button et al. ................. 707/749 |
| 2012/0323935 | A1 | * | 12/2012 | Evans et al. ................... 707/752 |
| 2013/0046651 | A1 | * | 2/2013  | Edson .......................... 705/26.4 |
| 2013/0117714 | A1 | * | 5/2013  | Rhee et al. .................... 715/823 |
| 2013/0127920 | A1 |   | 5/2013  | Grinshpon et al. |

(Continued)

*Primary Examiner* — Tuyetlien Tran
*Assistant Examiner* — David S Posigian
(74) *Attorney, Agent, or Firm* — Fish & Richardson P.C.

(57) ABSTRACT

Techniques for providing contextually-relevant content include monitoring interaction with content objects accessed through a portal by a user, at least a portion of the content objects presented to the user in a list through a graphical user interface (GUI); determining that the interaction with a particular content object of the content objects by the user exceeds a threshold interaction criteria; and updating the list of content objects presented to the user through the GUI with the particular content object based, at least in part, on the interaction with the particular content object exceeding the threshold interaction criteria.

24 Claims, 6 Drawing Sheets

(56) References Cited

U.S. PATENT DOCUMENTS

| | | |
|---|---|---|
| 2013/0159824 A1 | 6/2013 | Barak et al. |
| 2013/0166678 A1 | 6/2013 | Barak et al. |
| 2013/0227422 A1 | 8/2013 | Lehmann et al. |
| 2013/0238583 A1 | 9/2013 | Lehmann et al. |
| 2013/0239012 A1 | 9/2013 | Barak et al. |
| 2013/0268889 A1 | 10/2013 | Barak et al. |
| 2013/0282894 A1 | 10/2013 | Barak et al. |
| 2013/0283146 A1 | 10/2013 | Barak et al. |
| 2014/0046910 A1 | 2/2014 | Nathan et al. |
| 2014/0068509 A1 | 3/2014 | Kakishay et al. |
| 2014/0068545 A1 | 3/2014 | Lehmann et al. |
| 2014/0081683 A1 | 3/2014 | Barak |
| 2014/0101528 A1 | 4/2014 | Pelleg et al. |
| 2014/0164893 A1 | 6/2014 | Pariente et al. |
| 2014/0189804 A1 | 7/2014 | Lehmann et al. |
| 2014/0359735 A1 | 12/2014 | Lehmann et al. |
| 2014/0372427 A1 | 12/2014 | Lehmann et al. |
| 2015/0026755 A1 | 1/2015 | Lehmann et al. |

\* cited by examiner

SUGGESTING CONTEXTUALLY-RELEVANT CONTENT OBJECTS

TECHNICAL BACKGROUND

This disclosure relates to suggesting contextually-relevant content objects.

BACKGROUND

Business users of software in a business enterprise may access a virtual workspace through a portal to browse, view, modify, and/or otherwise manipulate data related to the business enterprise. Such data may include a variety of information in many different forms, such as sales data, revenue data, human resources information, business hierarchy information, and otherwise. Content objects, such as graphs, tables, charts, electronic communications, web services, reports, applications, and other forms of data, may be viewable in the user's workspace through the portal. The workspace may allow or facilitate the resolution of business issues and/or problems by the user. Such content objects may be constantly created and/or manipulated by a portal administrator in a portal administration environment. The content objects may be maintained in a portal repository in a hierarchical structure, which may be quite large. Although the portal administration environment may contain a search engine to help a user find such content objects, it may still require extensive action on the part of the user.

SUMMARY

This disclosure describes systems, methods, apparatus, and computer-readable media for providing contextually-relevant content objects to users. In some embodiments, to provide contextually-relevant content objects to the users, interaction with the content objects accessed through a portal by the users is monitored. The monitored interaction of a particular content object can be determined to exceed a threshold interaction criteria. For example, the user can interact with the particular content object over a threshold interaction criteria that relates to the type of the interaction (e.g., the user interacts with the particular content object for an amount of time greater than a threshold amount of time). A list of object objects can be updated for presentation to the user through a GUI, with the particular content object based on, at least in part, the interaction with the particular content object by the user exceeding the threshold interaction criterion.

A general embodiment of the subject matter described in this specification can be implemented in methods that include the actions of monitoring interaction with content objects accessed through a portal by a user, at least a portion of the content objects presented to the user in a list through a graphical user interface (GUI); determining that the interaction with a particular content object of the content objects by the user exceeds a threshold interaction criteria; and updating the list of content objects presented to the user through the GUI with the particular content object based, at least in part, on the interaction with the particular content object exceeding the threshold interaction criteria.

Other general embodiments include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In a first aspect combinable with any of the general embodiments, the monitored interaction includes at least one of editing one or more properties of the particular content object; editing a look and feel of the particular content object; editing metadata of the particular content object; setting a permission of the particular content object; or editing a structure of the particular content object.

In a second aspect combinable with any of the previous aspects, determining that the interaction with a particular content object of the content objects by the user exceeds a threshold interaction criteria includes determining a number of interaction instances with the particular content object by the user; comparing the determined number of interaction instances with a threshold number of instances; and determining that the number of interaction instances exceeds the threshold number of instances.

In a third aspect combinable with any of the previous aspects, determining that the interaction with a particular content object of the content objects by the user exceeds a threshold interaction criteria includes determining an amount of time interaction with the particular content object by the user; comparing the determined amount of time interaction with a threshold amount of time; and determining that the amount of time interaction exceeds the threshold amount of time.

In a fourth aspect combinable with any of the previous aspects, determining that the interaction with a particular content object of the content objects by the user exceeds a threshold interaction criteria further includes determining a type of the monitored interaction; comparing the type of the monitored interaction against one or more predetermined interaction types; and determining that the type of the monitored interaction matches a particular interaction type of the interaction types.

In a fifth aspect combinable with any of the previous aspects, updating the list of content objects presented to the user through the GUI with the particular content object includes identifying the list of content objects associated with the user; determining that a number of listed content objects exceeds a threshold value; removing at least one of the content objects from the list; and subsequent to removing the at least one content object, adding the particular content object to the list of content objects associated with the user.

A sixth aspect combinable with any of the previous aspects includes identifying a date on which each of the content objects was added to the list of content objects; identifying an earliest date of the identified dates; and removing a content object associated with the earliest date from the list of content objects associated with the user.

A seventh aspect combinable with any of the previous aspects includes identifying a role of the user in the portal during the monitored interaction of the content objects; determining that the particular content object of the content objects is associated with the role; and updating the list of content objects presented to the user through the GUI with the particular content object based, at least in part, on the determination that the particular content object is associated with the role.

Various embodiments of a contextually-relevant content filter module according to the present disclosure may have one or more of the following features. For example, the contextually-relevant content filter module will assist users in finding relevant content for their respective portal pages, and further suggest additional content that can be relevant to the user. This can save time for the users who seek relevant content without the need to browse or search in repositories.

These general and specific aspects may be implemented using a device, system or method, or any combinations of devices, systems, or methods. The details of one or more implementations are set forth in the accompanying drawings and the description below. Other features, objects, and advantages will be apparent from the description and drawings, and from the claims.

DETAILED DESCRIPTION

This specification describes systems, methods, apparatus, and computer-readable media for providing contextually-relevant content objects to users. In some embodiments, to provide contextually-relevant content objects to the users, interaction with the content objects accessed through a portal by the users is monitored. The monitored interaction of a particular content object can be determined to exceed a threshold interaction criteria. For example, the user can interact with the particular content object over a threshold interaction criteria that relates to the type of the interaction (e.g., the user interacts with the particular content object for an amount of time greater than a threshold amount of time). A list of object objects can be updated, for presentation to the user through a GUI, with the particular content object based at least in part on the interaction with the particular content object by the user exceeding the threshold interaction criterion.

Figure 1:
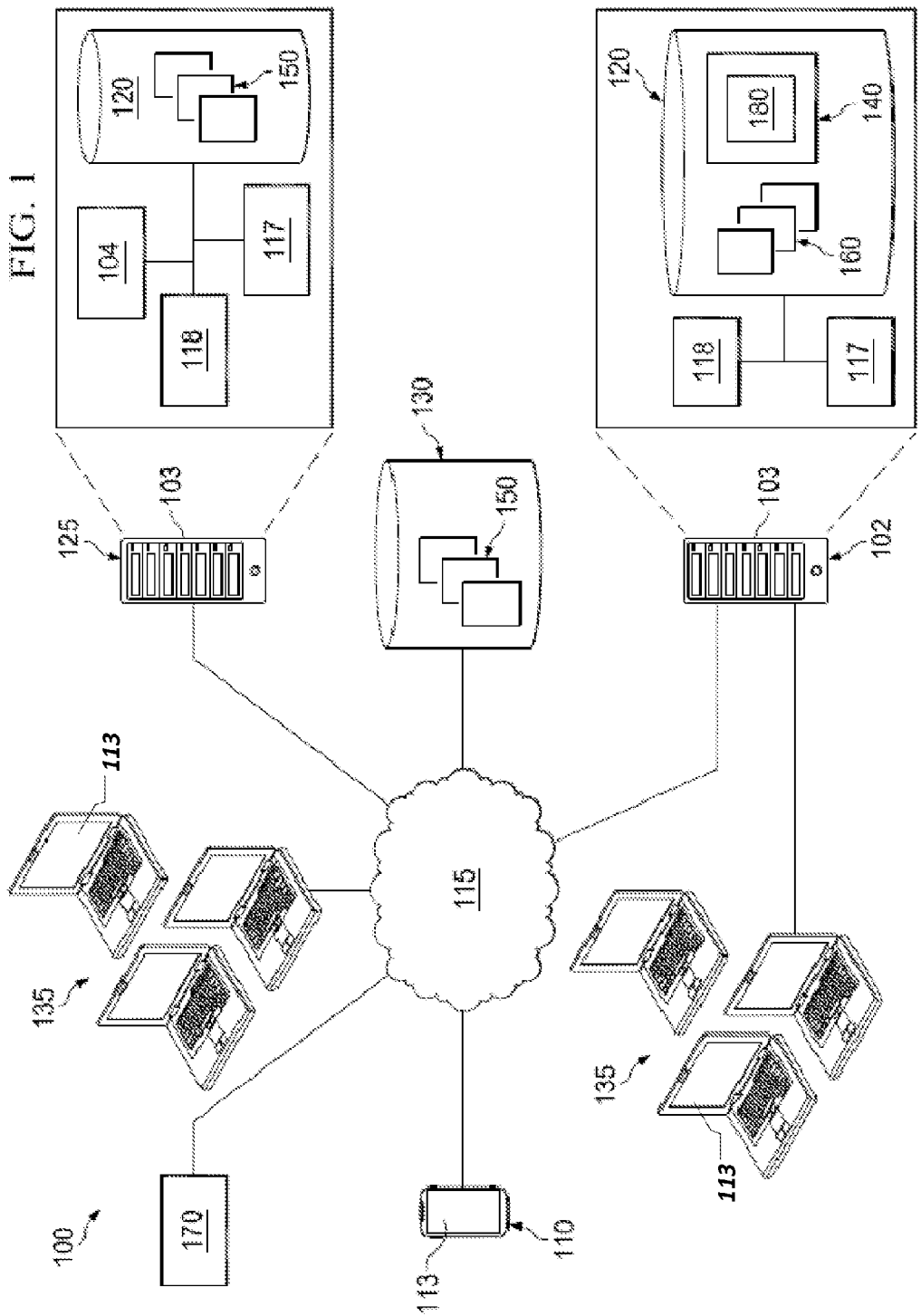
FIG. 1 illustrates an example distributed computing system operable to suggest contextually-relevant content objects.

FIG. 1 illustrates an example distributed computing system 100 operable to provide contextually-relevant content. For example, the illustrated environment 100 includes or is communicably coupled with an enterprise computing system 102, a mobile communications device 110 ("mobile device"), a software provider computing system 125, a repository 130, one or more client computing devices 135 ("clients"), and a third party content provider 170, at least some of which communicate across a network 115.

The illustrated enterprise computing system 102 and the software provider computing system 125 both include separate servers 103. In general, each server 103 stores one or more hosted applications, such as, for example, a contextually-relevant content filter module 104, where at least a portion of the hosted applications are executed via requests and responses sent to users or clients within and communicably coupled to the illustrated environment 100 of FIG. 1. In some instances, the server 103 may store one or more various hosted applications, while in other instances, the server 103 may be a dedicated server meant to store and execute only a single hosted application (e.g., the contextually-relevant content filter module 104). In some instances, the server 103 may include a web server, where the hosted applications represent one or more web-based applications accessed and executed via network by the mobile device 110, the clients 135, or both to perform the programmed tasks or operations of the hosted application.

At a high level, each server 103 includes an electronic computing device operable to receive, transmit, process, store, or manage data and information associated with the environment 100. For example, one or both of the servers 103 illustrated in FIG. 1 may be responsible for receiving application requests from one or more client applications associated with the mobile device 110, the clients 135 or both of the environment 100 and responding to the received requests by processing said requests in an associated hosted application, and sending the appropriate response from the hosted application back to the requesting client application. In addition to requests from the mobile device 110, the clients 135 or both illustrated in FIG. 1, requests associated with the hosted applications may also be sent from internal users, external or third-party customers, other automated applications, as well as any other appropriate entities, individuals, systems, or computers.

As used in the present disclosure, the term "computer" is intended to encompass any suitable processing device. For example, although FIG. 1 illustrates single servers 103 for each of the enterprise computing system 102 and software developer computing system 125, environment 100 can be implemented using two or more servers 103 for each computing system (102 and 125), as well as computers other than servers, including a server pool. Indeed, server 103 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated server 103 may be adapted to execute any operating system, including Linux, UNIX, Windows, Mac OS, or any other suitable operating system.

The server 103 of software provider computing system 125 includes a contextually-relevant content filter module 104. The contextually-relevant content filter module 104 filters the web content such that contextually-relevant content is displayed to a user of the mobile device 110, the client devices 135, or both, as described further below. The contextually-relevant filter module 104 can be implemented by and stored by any combination of the enterprise computing system 102, the software providing computer system 125, the repository 130, the clients 135, and the mobile device 110.

Each of the illustrated servers 103 also includes an interface 117, a processor 118, and a memory 120. The interface 117 is used by the server 103 for communicating with other systems in a distributed environment—including within the environment 100—connected to the network 115; for example, the clients 135, the mobile device 110, or both, as well as other systems communicably coupled to the network 115. Generally, each interface 117 includes logic encoded in software and/or hardware in a suitable combination and operable to communicate with the network 115. More specifically, each interface 117 may include software supporting one or more communication protocols associated with communications such that the network 115 or interface's hardware is operable to communicate physical signals within and outside of the illustrated environment 100.

As illustrated in FIG. 1, each of the servers 103 includes a processor 118. Although illustrated as a single processor 118 in FIG. 1, two or more processors may be used according to particular needs, desires, or particular embodiments of the environment 100. Each processor 118 may be a central processing unit (CPU), a blade, an application specific integrated circuit (ASIC), a field-programmable gate array (FPGA), or another suitable component. Generally, the processor 118 executes instructions and manipulates data to perform the operations of the server 103. For example, the processor 118 executes the functionality required to receive and respond to requests from the clients 135 and/or the mobile device 110.

Regardless of the particular implementation, "software" may include computer-readable instructions, firmware, wired or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java, Visual Basic, assembler, Perl, any suitable version of 4GL, as well as others. While portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate.

Each of the servers 103 also includes a memory 120, or multiple memories 120. The memory 120 may include any memory or database module and may take the form of volatile or non-volatile memory including, without limitation, magnetic media, optical media, random access memory (RAM), read-only memory (ROM), removable media, or any other suitable local or remote memory component. The memory 120 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the computing system 102, 125. Additionally, the memory 120 may include any other appropriate data, such as VPN applications, firmware logs and policies, firewall policies, a security or access log, print or other reporting files, as well as others.

The environment further includes a repository 130. In some embodiments, the repository 130 is an in-memory repository. The repository 130 can be a cloud-based storage medium. For example, the repository 130 can be networked online storage where data is stored on virtualized pools of storage.

The illustrated environment of FIG. 1 also includes one or more clients 135 and the mobile device 110, or multiple mobile devices 110. Each client 135 and/or the mobile device 110 may be any computing device operable to connect to or communicate with at least the computing systems 102, 125 and/or via the network 115 using a wireline or wireless connection. In general, each client 135 and/or the mobile device 110 includes an electronic computer device operable to receive, transmit, process, and store any appropriate data associated with the environment 100 of FIG. 1.

There may be any number of clients 135 and/or mobile devices 110 associated with, or external to, the environment 100. For example, while the illustrated environment 100 includes six clients 135 and one mobile device 110, alternative implementations of environment 100 may include a single client 135 or multiple mobile devices 110 communicably coupled to the server 102 and/or the network 115, or any other number suitable to the purposes of the environment 100.

Additionally, there may also be one or more additional clients 135 and/or mobile devices 110 external to the illustrated portion of environment 100 that are capable of interacting with the environment 100 via the network 115. Further, the term "client" and "user" may be used interchangeably as appropriate without departing from the scope of this disclosure. Moreover, while each client 135 and/or the mobile device 110 is described in terms of being used by a single user, this disclosure contemplates that many users may use one computer, or that one user may use multiple computers. As used in this disclosure, the client 135 is intended to encompass a personal computer, tablet computer, smart phone, cell phone, personal digital assistant (PDA), touch screen terminal, workstation, network computer, kiosk, one or more processors within these or other devices, or any other suitable processing device.

The illustrated mobile device 110 may be any mobile computing device such as a wireless data port, smart phone, personal data assistant (PDA), tablet computing device, one or more processors within these devices, or any other suitable processing device. For example, each client 135 and the mobile device 110 may include a computer that includes an input device, such as a keypad, touch screen, mouse (in the client 135 example), or other device that can accept user information, and an output device that conveys information associated with the operation of the computing systems 102, 125 or the client 135 or the mobile device 100 itself, including digital data, visual information, or a graphic user interface (GUI) 113, as shown with respect to the mobile device 110. In the example of the clients 135, both the input and output device may include fixed or removable storage media such as a magnetic storage media, CD-ROM, or other suitable media to both receive input from and provide output to users of the clients 135 through the display.

Further, the illustrated mobile device 110 includes the GUI 113 to interface with at least a portion of the environment 100 for any suitable purpose, including generating a visual representation of a web browser. Generally, through the GUI 113, the user is provided with an efficient and user-friendly presentation of data provided by or communicated within the system. The term "graphical user interface," or GUI, may be used in the singular or the plural to describe one or more graphical user interfaces and each of the displays of a particular graphical user interface. Therefore, the GUI 113 can represent any graphical user interface, including but not limited to, a web browser, touch screen, or command line interface (CLI) that processes information in the environment 100 and efficiently presents the information results to the user. In general, the GUI 113 may include one or more user interface (UI) elements, some or all associated with a web browser, such as interactive fields, pull-down lists, and buttons operable by the user at the mobile device 113. These and other UI elements may be related to or represent the functions of the web browser. In particular, the GUI 113 may be used to view and navigate various web pages located both internal and external to the server.

In some embodiments, one or more of the mobile device 110 (or mobile devices 110) and clients 135 may access one or more applications hosted on the software developer computing system 125 through a portal such as an enterprise portal, also known as an enterprise information portal (EIP) or corporate portal. The web portal (e.g., portal 204 illustrated in FIG. 2) may be a framework for integrating information, people and processes across organizational boundaries. It provides a secure unified access point, often in the form of a web-based user interface, and is designed to aggregate and personalize information through application-specific portlets. For example, the web portal may exhibit de-centralized content contribution and content management, which keeps the information always updated. With only a web browser, users can begin work once they have been authenticated in the portal which offers a single point of access to information, enterprise applications, and services both inside and outside an organization. Enterprise portals may present information from diverse sources in a unified way, and provide additional services, such as an internal search engine, e-mail, news, and various other features. Enterprise portals are often used by enterprises for providing their employees, customers, and possibly additional users with a consistent look and feel, and access control and procedures for multiple applications, which otherwise would have been separate entities altogether The environment 100 further includes user data 140, web content 150, and content objects 160. In the illustrated embodiment, the user data 140 is stored by the memory 120 of the enterprise computing system 102. However, the user data 140 can be stored in any combination of the memory of the mobile device 110, the enterprise computing system 102, the software provider service computing system 125, the repository 130, and/or the clients 135. In some implementations, the user data 140 is stored by a third party that provides networked online storage. In some embodiments, the user data 140 can include user profiles 180 of users of the clients 135 and the mobile device 110. The user profiles 180 can include information (e.g., properties) specific to the users, including identifying information such as user name, role of the user (within the portal) (e.g., "human resources manager"), related projects (e.g., "software development"), language (e.g., English or German), location (e.g., different worksites of the organization), and authorization (e.g., security level). Additionally, the user profiles 180 can include information added by the organization, at any time.

The illustrated web content 150 is the textual, visual or aural content that is encountered as part of the user experience on websites. The web content 150 may include, among other things: text, images, sounds, videos, applications, sub-applications, and animations. The web content is stored by any combination of the software provider service computing system 125 and the repository 130.

The illustrated content objects 160 are sub-portions of the web content 150. The content objects 160 are any kind of application, information, or service that can be visualized in a Web browser frame. The content objects 160, in some embodiments, may be self-contained Web documents that are provided via a Uniform Resource Locator (URL) that are managed by the enterprise computing system 102. For example, the content objects 160 can include alerts, reports, emails, calendars, text documents, multimedia files, reports, files, applications, web snippets, and other content objects. For example, if a user enters a word in a dictionary content object 160, the definition appears inside the area of the content object 160. A link to usage examples, similar words, etc. can also be provided.

The content objects 160 can include one or more of the characteristics of: stateless (not permanently connected to any component of the environment 100); embedded (non-dominant, parallel to other content objects 160); provide previews on underlying processes and/or data; one-screen interactions; include only key functionality; provide direct access without navigation; push information and refresh periodically; integration with third-party software; and allow users to modify an appearance thereof. The content objects 160 may provide data, for example, providing active information; monitor business processes; preview data and processes; display notifications for starting task-related processes; and offering access to often used data. The sub content objects 160 may further provide direct access to simple applications; accelerated access to other applications; reduction of information and interaction to the necessary; and drag-and-relate that use outputs as inputs within the environment 100. The content objects 160 offer customization such that specific content objects 160, along with reduction of information and tailoring of information presented by the content objects 160, can be implemented according to the user data 160.

As illustrated, the content objects 160 are stored by the memory 120 of the enterprise computing system 102. However, the content objects 160 can be stored in any combination of the memory the enterprise computing system 102, the software provider service computing system 125, and/or the repository 130. In some embodiments, the content objects 160 can be provided by and stored by the third party content provider 170.

Figure 2:
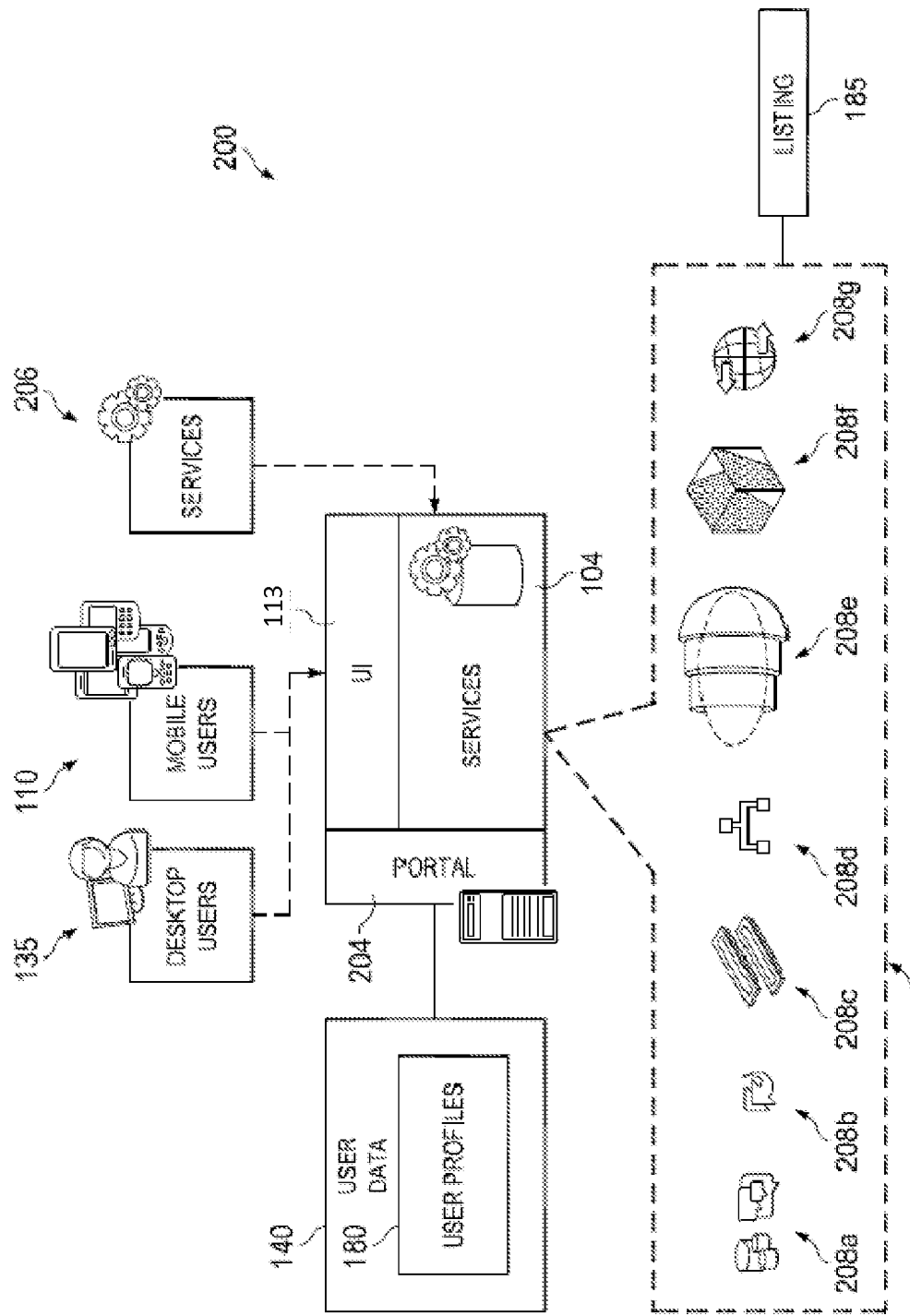
FIG. 2 illustrates an example architecture of a distributed computing system operable to suggest contextually-relevant content objects.

FIG. 2 illustrates an example environment 200 of a distributed computing system operable to suggest contextually-relevant content objects. The environment 200 includes the clients 135, the mobile device 110, the contextually-relevant content filter module 104, the graphical user interface (GUI) 113, a portal 204, services 206, content sources 208a-208g, the content objects 160, and the user data 140 that includes the user profiles 180.

The content objects 160 that are accessed by users of the clients 135, users of the mobile device 110, or users of both ("users") are identified. The users access the content objects 160 through interaction with the GUI 113. Each of the users are associated with one or more roles of one or more roles that are defined within the portal 204. The role(s) that each user is associated with is stored in the user profile 180 for each user. In some embodiments, the role defines a user's position within an organizational structure, such as a user's employment role within a company. For example, the roles of a particular user can include a developer's role, a manager's role, a human resources role, or any combination thereof. Thus, the particular user can be associated with multiple roles. In some embodiments, at least two users are associated with at least one same role. For example, two users are both associated with the developer's role. Further, in some embodiments, the two users are both associated with the developer's role and the human resources role. The content objects 160 can be stored by, and retrieved from, the one or more content sources 208a-208g.

In the illustrated embodiment, the services 206 may facilitate communication between the contextually-relevant content filter module 104 and one or more clients 135 and/or mobile communication devices 110 outside of the GUI 113. Accordingly, such clients 135 and mobile communication devices 110 may implement the functionality of the contextually-relevant content filter 104 without accessing the GUI 113 (i.e., without a UI layer), such as, for example, through a query.

Content source 208a, for instance, may include a collaboration module that stores, references, and/or accumulates content for sharing and other collaborative actions across multiple systems and/or user (such as across a business enterprise). For example, a collaborative environment or collaboration module in an enterprise environment may share and accumulate information (i.e., content) that enables users to share content and work together in mutual areas in the portal.

Content source 208b, for instance, may include an enterprise resource system (ERP) associated with the software developer computing system 125 that integrates internal and external business and management information across a business enterprise (e.g., finance/accounting, manufacturing, sales and service, and customer relationship management streams of data). The ERP system may facilitate the flow of information between all business functions inside the boundaries of the organization and manage the connections to outside customers and/or clients. The ERP system may include a client/server architecture with one or more databases with modifiable software executing thereon to provide an end-to-end business solution.

Content source 208c, for instance, may include content stored, referenced, and/or calculated on an in-memory database (e.g., electronic memory rather than magnetic memory) associated with the software developer computing system 125. The in-memory database may include integrated processing, i.e., all business and/or analytic operations done in processing memory. Moreover, content from business content sources may be replicated from one or more transactional systems (e.g., coupled to the network 115) to the in-memory database immediately. Thus, the in-memory database, in some aspects, may handle the analytical systems for all business data in real-time, as opposed to, for instance, computational processing systems that have separate transactional and analytical systems that connect through relational databases (i.e., relational databases stored on magnetic memory that require a process, e.g., ETL, to transfer data from one system to another not in real time but with a delay of an hour, day, week, or longer). In some embodiments, the in-memory database may expose business data and capabilities to improve an end-solution for end users (e.g., the clients 135). The in-memory database may reside on top of a computational engine that facilitates fast manipulations on large amounts of business data and/or replication of entire business suite information. Thus, in some embodiments, the in-memory database may provide for the following design principles/concepts: business data in real-time (e.g., GUI patterns for constantly updated business data); well modeled tables and data cubes (e.g., in order to provide semantic services); a highly parallelized computational engine (e.g., for computationally intensive GUI patterns such as real time alerts and/or suggestions); close coupling of business logic and business data (e.g., eliminating indexing and caching).

Content source 208d, for instance, may include a gateway technology associated with the software developer computing system 125 that provides a simple way to connect devices, environments and platforms based on market standards. For example, the gateway may, for example, be a front-end server to a business suite application and expose business suite services in an open protocol format. Exposed content may include, business and/or social data through social updates, for example, Twitter, Facebook, RSS feed/channels, and/or other feed sources or channels.

Content source 208e, for instance, may include a business object repository. Each business object stored in the repository, for example, may include a capsule with an internal hierarchical structure, behavior offered by its operations, and integrity constraints. In general, the overall structure of the business object model ensures the consistency of the interfaces that are derived from the business object model. The derivation helps ensure that the same business-related subject matter or concept can be represented and structured in the same way in various interfaces. The business object model defines the business-related concepts at a central location for a number of business transactions. In other words, it reflects the decisions made about modeling the business entities of the real world acting in business transactions across industries and business areas. The business object model is defined by the business objects and their relationship to each other (the overall net structure).

Business objects are generally semantically disjointed, i.e., the same business information is represented once. In some embodiments, the business objects are arranged in an ordering framework such that they can be arranged according to their existence dependency to each other. For example, in a modeling environment, the customizing elements might be arranged on the left side of the business object model, the strategic elements might be arranged in the center of the business object model, and the operative elements might be arranged on the right side of the business object model. Similarly, the business objects can be arranged in this model from the top to the bottom based on defined order of the business areas, e.g., finance could be arranged at the top of the business object model with customer relationship management (CRM) below finance and supplier relationship management (SRM) below CRM. To help ensure the consistency of interfaces, the business object model may be built using standardized data types as well as packages to group related elements together, and package templates and entity templates to specify the arrangement of packages and entities within the structure.

A business object may be defined such that it contains multiple layers. Typical business object may contain four layers: a kernel layer, an integrity layer, an interface layer, and an access layer. The innermost layer of the example business object is the kernel layer. The kernel layer represents the business object's inherent data, containing various attributes of the defined business object. The second layer represents the integrity layer. The integrity layer contains the business logic of the object. Such logic may include business rules for consistent embedding in a computing environment and the constraints regarding the values and domains that apply to the business object. Business logic may include statements that define or constrain some aspect of the business, such that they are intended to assert business structure or to control or influence the behavior of the business entity. It may pertain to the facts recorded on data and constraints on changes to that data. In effect, business logic may determine what data may, or may not, be recorded in business object. The third layer, the interface layer, may supply the valid options for accessing the business object and describe the implementation, structure, and interface of the business object to the outside world. To do so, the interface layer may contain methods, input event controls, and output events. The fourth and outermost layer of the business object is the access layer. The access layer defines the technologies that may be used for external access to the business object's data. Some examples of allowed technologies may include COM/DCOM (Component Object Model/Distributed Component Object Model), CORBA (Common Object Request Broker Architecture), RFC (Remote Function Call), Hypertext Transfer Protocol (HTTP) and Java, among others. Additionally, business objects of this embodiment may implement standard object-oriented technologies such as encapsulation, inheritance, and/or polymorphism.

Content source 408f, for instance, may include, a business intelligence module that, at a high level, provides software and/or middleware services for performance analytics (e.g., supports organizational efforts to develop sophisticated visual representations of processes and performance, providing organizations with new insights that can help them make more informed decisions, assess and plan a business intelligence strategy, deploy dashboard tools, generate management and operational reports, and build an IT infrastructure that provides high scalability for users and data); services for analytic applications (e.g., provides guidance and deployment expertise in implementing analytic applications, offering pre-built analytics and data models to help a customer with a specific business problem in various industries, helping organizations to efficiently deploy applications); and introductory business intelligence services (e.g., introduces organizations to the dynamics of using business intelligence, providing the ability to leverage the functionality of business intelligence—such as executive dashboards and operational reports—without initiating a full-scale implementation).

Content source 208f, for instance, may be content from third party platforms, such as content from third parties unaffiliated with, for example, the software developer computing system 125 and enterprise computing system 102. For instance, content source 208f may be content from third party content provider 170.

To that end, in some examples, the content objects 160 can be provided to the mobile device 110 and/or the clients 135 that are determined to be contextually-relevant to the users of the mobile device 110, users of the clients 135, or users of both ("users"). Specifically, to provide contextually-relevant content objects 160 to the users, interaction with the content object 160 accessed through the portal 204 by the users is monitored. In some examples, the content objects 160 are presented to the users in a list 185. In some examples, the list 185 is presented to the users through a graphical user interface (e.g., the GUI 113 presented by the mobile device 110). The monitored interaction of a particular content object 160 of the content objects 160 can be determined to exceed a threshold interaction criteria. For example, the user can interact with the particular content object 160 over (or equal to) a threshold interaction criteria that relates to the type of the interaction (e.g., the user interacts with the particular content object 160 for an amount of time greater than a threshold amount of time). The list 185 of the content objects 185 can be updated for presentation to the user through the GUI with the particular content object 160 based on, at least in part, the interaction with the particular content object 160 by the user exceeding the threshold interaction criterion.

Specifically, interaction with the content objects 160 by the users is monitored. The users can interact with the content objects 160 through the portal 204. For example, the users can be presented the content objects 160 via a graphical user interface of the device (e.g., the mobile device 110 or the clients 135) employed to access the portal 204 (e.g., the GUI 113 of the mobile device 110). The user can interact with one or more of the content object 160 by employing one of the above-mentioned input devices associated with the mobile device 110 or the clients 135. The interaction with each of the one or more content objects 160 by the user can have associated properties with the interaction. For example, for each interaction with the one or more content objects 160, an amount of time of the interaction and a type of the interaction is monitored. Furthermore, for each content object 160, a number of interactions by the user with the particular content object 160 can be recorded. For example, the user interacted with the particular content object 160 five times over two different time periods (e.g., three times at a first time and two times at a second time), the total number of interactions for the particular content object is five. In some further embodiments, for a particular content object 160, the amount of time of each interaction can be summed to provide a total interaction time. In some embodiments, the portal 204 monitors the interaction with the content objects 160 by the users. In some embodiments, the contextually-relevant content filter module 104 monitors the interaction with the content objects 160 by the users.

In some embodiments, the content objects 160 are presented to the user in a listing or other graphical representation. For example, a name associated with each of the content objects 160 can be presented in the list 185. In some examples, the content objects 160 can be represented as graphical tiles, and presented in a tile-based interface. However, the content objects 160 can be presented in any fashion as desired for the user to perceive and interact with the content objects 160. The list 185 of the content objects 160 can be presented through a graphical user interface of the mobile device 110 (e.g., the GUI 113) or the clients 135.

In some embodiments, the particular content object 160 can have an associated ranking value. The ranking value can be based on, for each particular content object 160, the number of interactions, the type of the interaction, the amount of time of the interaction, or any combination thereof. In some examples, the list 185 of the content objects 160 can be dependent upon (or based upon) the ranking values of the content objects 160. Specifically, the list 185 of the content objects 160 can be ordered from the content object 160 having the highest ranking value to the content object 160 having the lowest ranking value. In some examples, the list 185 of the content objects 160 can be ordered based on other ordering mechanisms, such as alphabetization of the content objects 160.

In some embodiments, the type of the (monitored) interaction with the content objects 160 by the user can include editing properties of the particular content object 160 (e.g., a title and/or content); editing a look and feel of the particular content object 160 (e.g., font, color); editing metadata of the particular content object 160 (e.g., tags); setting a permission of the particular content object 160; editing a structure of the particular content object 160; or any combination thereof.

The monitored interaction of a particular content object 160 of the content objects 160 can be determined to exceed a threshold interaction criteria. For example, the user interacts with the particular content object 160 such that a property associated with the interaction is above a threshold interaction criteria. In some embodiments, the threshold interaction criteria associated with a particular content object 160 is dependent upon the particular content object 160. For example, for a particular type of interaction (e.g., a time-based interaction), the threshold interaction criteria can differ for different content objects 160. For instance, for a first content object 160, the threshold interaction criteria can be five minutes such that a time-based interaction with the first content object 160 over five minutes exceeds the threshold interaction criteria of the first content object 160; for a second content object 160, the threshold interaction criteria can be twenty minutes such that time-based interaction with the second content object over 20 minutes exceeds the threshold interact criteria of the second content object.

In some embodiments, the threshold interaction criteria can be dependent upon (or based upon) the particular interaction. For example, a time-based interaction with the particular content object 160 can be associated with a time-based threshold interaction criteria; and an event type-based interaction with the particular content object 160 can be associated with an event-based threshold interaction criteria. Thus, differing interactions with the content objects 160 can be associated with differing threshold interaction criteria. In some examples, the same particular content object 160 can be associated with two or more differing threshold interaction criteria. In some examples, two or more differing particular content objects 160 can be associated with the same threshold interaction criteria. In some embodiments, the portal 204 determines that the monitored interaction of a particular content object 160 exceeds a threshold interaction criteria. In some embodiments, the contextually-relevant content filter module 104 determines that the monitored interaction of a particular content object 160 exceeds a threshold interaction criteria.

In some embodiments, the monitored interaction of the particular content object 160 can be associated with a number of interaction instances with the particular content object 160. Specifically, as mentioned above, for each content object 160, a number of interactions by the user with the particular content object 160 can be determined. In some examples, the number of interaction instances can be a subset of the total number of interactions with the particular content object 160 by the user. For instance, the subset of the total number of interactions can include interactions that were of an amount of time greater than a time threshold; interactions of a specific type; or any combination thereof.

The number of interaction instances can be compared to a threshold number of instances. The number of instances that are compared to the threshold number of instances can include either the total number instances or any subset of the total number of instances. In some examples, the threshold number of instances associated with a particular content object 160 can be dependent upon (or based upon) a type (or category) of the particular content object 160. For instance, for a first content object 160 of a first type (e.g., a content object 160 relating to sales reports), the threshold number of instances can be six instances, while for a second content object 160 of a second type (e.g., a content object 160 relating to accounting reports), the threshold number of instances can be ten instances. Based on the comparison, the number of interaction instances can be determined to exceed the threshold number of instances. For example, for a particular content object 160, the number of interaction instances of the particular content object 160 is fifteen interaction instances (of the same type of interaction or of varying types of interactions). The threshold number of instances associated with a particular content object 160 is ten interaction instances. Thus, the number of interaction instances of the particular content object 160 (e.g., fifteen interaction instances) is determined to exceed the threshed number of instances associated with the particular content object 160 (e.g., ten interaction instances).

In some embodiments, the monitored interaction of the particular content object 160 can be associated with an amount of time of the monitored interaction with the particular content object 160. Specifically, as mentioned above, for each interaction with the particular content object 160, an amount of time of the interaction can be determined. In some examples, the amount of time can be an amount of time for a particular interaction with the particular content object 160. In some examples, the amount of time for each interaction of the particular content object 160 can be summed to provide a total interaction time. In some examples, the amount of time for a particular interaction of a particular content object 160 is determined for interactions of a particular type (e.g., the amount of time of editing the metadata of the particular content object 160 is determined while the amount of time of setting a permission of the particular content object 160 is not determined). In some examples, when the amount of time is the total interaction time, only amount of times for a subset of the total number of interactions is used in the total interaction time. For instance, the subset of the total number of interactions can include interactions that are of a specific type.

The determined amount of time can be compared to a threshold amount of time. The determined amount of time can include the amount of time for a particular interaction with the particular content object 160 or can include the total interaction time with the particular content object 160. In some examples, the threshold amount of time associated with a particular content object 160 can be dependent upon (or based upon) a type (or category) of the particular content object 160. For instance, for a first content object 160 of a first type (e.g., a content object 160 relating to expense reports), the threshold amount of time can be six minutes, while for a second content object 160 of a second type (e.g., a content object 160 relating to industry news), the threshold amount can be ten minutes. Based on the comparison, the amount of time can be determined to exceed the threshold amount of time. For example, for a particular content object 160, the amount of time of the interaction of the particular content object 160 is fifteen minutes. The threshold amount of time associated with a particular content object 160 is ten minutes. Thus, the amount of time of the interaction of the particular content object 160 (e.g., fifteen minutes) is determined to exceed the threshed amount of time associated with the particular content object 160 (e.g., minutes).

In some embodiments, the monitored interaction of the particular content object 160 can be associated with a type of the monitored interaction with the particular content object 160. Specifically, as mentioned above, for each interaction with the particular content object 160, a type of the interaction can be determined. In some examples, the type of the interaction for a particular interaction of a particular content object 160 is determined for interactions having an amount of time greater than a threshold amount of time (e.g., the type of interaction of the particular content object 160 is determined for interactions over the threshold amount of time while the type of interaction of the particular content object 160 is not determined for interactions under the threshold amount of time). The type of the monitored interaction can be compared against a predetermined plurality of interaction types. In some examples, the plurality of interaction types can be dependent upon (or based upon) a type (or category) of the particular content object 160. Based on the comparison, the type of the monitored interaction can be determined to match a particular interaction type of the plurality of interaction types.

The list 185 of the content objects 160 can be updated with the particular content object 160 based on the interaction by the user with the particular content object 160 exceeding the threshold interaction criteria. The list 185 of the content objects 160 can be updated for presentation to the user through the GUI of the device (e.g., the mobile device 110 or the clients 135) employed to access the portal 204 (e.g., the GUI 113 of the mobile device 110). The updated list 185 of the content objects 160 can include the particular content object 160 when a property of the particular content object 160 is above an associated threshold interaction criteria. For example, when the property of the particular content object 160 includes an amount of time of the interaction, the list 185 of the content objects 160 is updated with the particular content object 160 when the amount of time of the interaction is above a threshold amount of time. For example, when the property of the particular content object 160 includes a type of the interaction, the list 185 of the content objects 160 is updated with the particular content object 160 when the type of the interaction is matched to an interaction type of a listing of one or more interaction types. For example, when the property of the particular content object 160 includes a number of interactions, the list 185 of the content objects 160 is updated with the particular content object 160 when the number of interactions is above a threshold number of interactions. In some embodiments, the portal 204 updates the list 185 of the content objects 160 with the particular content object 160. In some embodiments, the contextually-relevant content filter module 104 updates the list 185 of the content objects 160 with the particular content object 160.

In some embodiments, updating the list 185 of the content objects 160 with the particular content object 160 can further include removing a content object 160 from the list 185 prior to updating the list 185 of the content object 160. Specifically, the list 185 of the content objects 160 that is associated with the user can be identified. The list 185 of the content objects 160 can be stored by the memory 120 of the enterprise computing system 102. However, the content objects 160 can be stored in any combination of the memory the enterprise computing system 102, the software provider service computing system 125, and/or the repository 130. In some embodiments, the content objects 160 can be provided by and stored by the third party content provider 170.

The number of content objects 160 of the list 185 can be identified and determined to exceed a threshold value. Specifically, the list 185 of the content objects 160 can include a predetermined number of content objects 160, up to a limit (e.g., the threshold value). Thus, only a limited number of content objects 160 can be associated with the user (e.g., via the list 185). In some examples, the threshold value associated with the list 185 of the content objects 160 can be dependent upon (or based upon) the user associated with the list, the specific content objects 160, or a combination thereof.

When the number of the content objects 160 exceeds the threshold value, at least one of the content objects 160 is removed from the list 185 of the content objects 160. Specifically, the association between the at least one content object 160 and the list 185 of the content objects 160 for the user is removed (e.g., deleted). In some examples, the at least one content object 160 is removed from the list 185 of the content objects 160 as presented to the user via the GUI (e.g., the GUI 113 of the mobile device 110) such that the user no longer is able to view the at least one content object 160 (and the list 185 thereof), while the at least one content object 160 remains associated with the list 185 of the content objects 160 in the background (e.g., in memory storing the list 185 of the content objects 160).

After removing the at least one content object 160 from the list 185 of the content objects 160, the particular content object 160 is added to the list 185 of the content objects 160 associated with the user. Specifically, the list 185 of the content objects 160 associated with the user is updated to include the particular content object 160 while removing the at least one content object 160. In some embodiments, the portal 204 removes the at least one content object 160 from the list 185 prior to updating the list 185 of the content objects 160. In some embodiments, the contextually-relevant content filter module 104 removes the at least one content object 160 from the list 185 prior to updating the list 185 of the content objects 160.

In some embodiments, the at least one content object 160 that is removed from the list 185 of the content objects 160 is the at least one content object 160 having an earliest data of the content objects 160 of the list 185. Specifically, each of the content objects 160 can have an associated date. The associated date can be the data the content object 160 was added to the list 185 of the content objects 160 (e.g., the date the list 185 of the content objects 160 was updated with the particular content object 160). The associated date of each of the content objects 160 of the list 185 of the content objects 160 can be identified. Thus, based on identifying the associated dates, an earliest date of the identified dates can be identified (e.g., the content object 160 being the "oldest" of the content objects 160). The content object 160 that is associated with earliest date is removed from the list 185 of the content objects 160 associated with the user. Thus, a "first-in, first-out" (FIFO) system can be employed.

In some embodiments, the at least one content object 160 that is removed from the list 185 of the content objects 160 is the at least one content object 160 having a lowest ranking among the content objects 160 of the list 185. Specifically, as mentioned above, each of the content objects 160 can have an associated ranking value. The ranking value of each of the content objects 160 of the list 185 can be identified. Thus, based on identifying the associated ranking values, a lowest ranking of the identified ranking values can be identified. The content object 160 that is associated with the lowest ranking is removed from the list 185 of the content objects 160 associated with the user. In some examples, a content object 160 having a particular ranking can be removed.

In some additional embodiments, the list 185 of the content objects 160 can be updated based on determining that a particular content object 160 is associated with a role of the user. Specifically, as mentioned above, the user profiles 180 associated with the user can include information specific to the user, such as the role of the user (e.g., the position or job of the user within an organization as defined within the portal 204). The role (or roles) of the user in the portal 204 can be identified during the monitored interaction of the user with the content objects 160 mentioned above. In some examples, the role (or roles) of the user in the portal 204 can be identified at any time (such as prior to or after the monitored interaction of the user with the content objects 160). It is determined that a particular content object 160 is associated with at least one role of the user in the portal 204. In some examples, the particular content object 160 is associated with two or more roles of the user. In some examples, two or more content objects 160 are associated with the role of the user in the portal 204.

After determining that the particular content object 160 is associated with one or more roles of the users, the particular content object 160 is added to the list 185 of the content objects 160 associated with the user. Specifically, the list 185 of the content objects 160 associated with the user is updated to include the particular content object 160. The list 185 of the content objects 160 is updated to include the particular content object 160 based on (or dependent on), at least, the determination that the particular content object 160 is associated with the user. In some examples, the list 185 of the content objects 160 is updated to include the particular content object 160 while removing at least one content object 160. In some embodiments, the portal 204 removes the at least one content object 160 from the list 185 prior to updating the list 185 of the content objects 160. In some embodiments, the contextually-relevant content filter module 104 removes the at least one content object 160 from the list 185 prior to updating the list 185 of the content object 160.

Figure 3A:
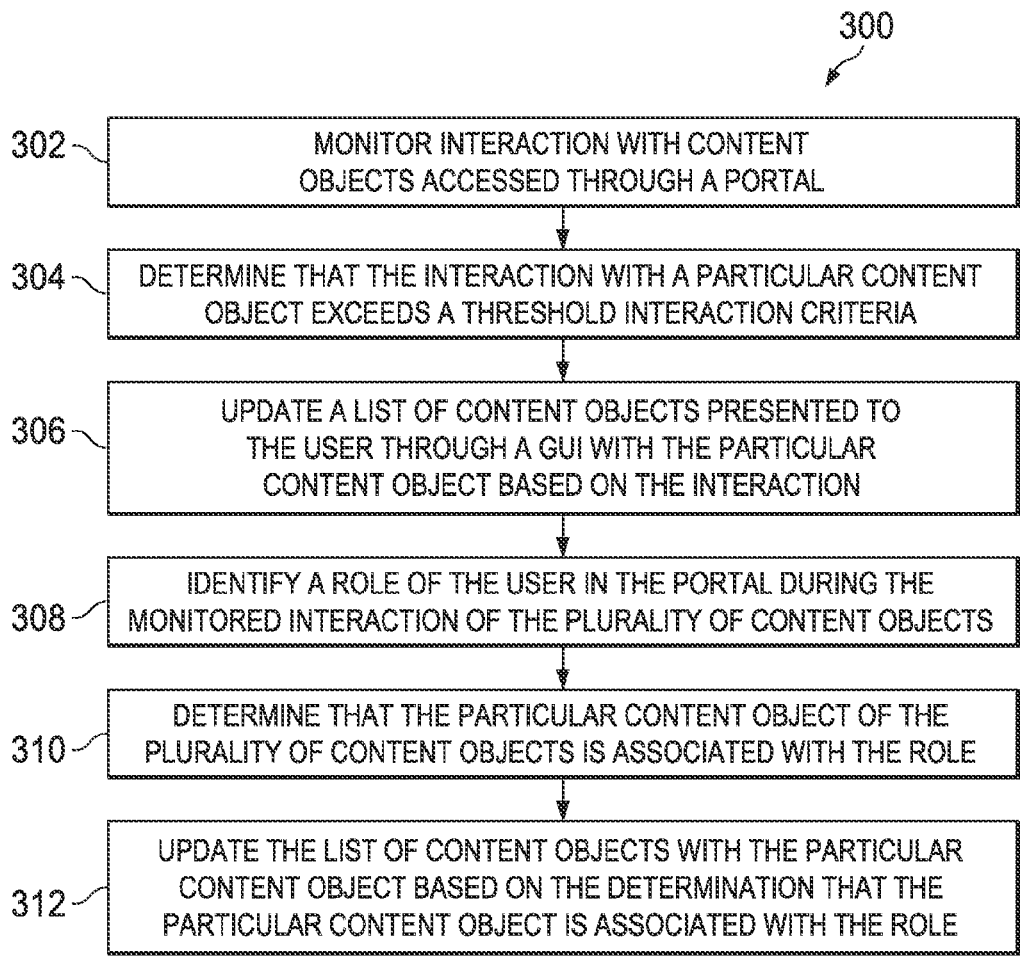
FIGS. 3A-3E illustrate example methods for suggesting contextually-relevant content objects.

FIG. 3A illustrates an example method 300 for providing contextually-relevant content. The example method 300 can be executed, for example, by the contextually-relevant content filter module 104, using one or more computing devices. For example, any combination of the computing systems 102, 125 and the mobile device 110 can be used to execute the example process 300 and obtain any data from the memory of the mobile device 110, the computing systems 102, 125, the repository 130, and/or the clients 135.

In step 302, interaction with content objects accessed through a portal is monitored. For example, the contextually-relevant content filter module 104 or the portal 204 monitors interaction with the content objects 160 that are accessed by the user through the portal 204. The interaction with each of the one or more content objects 160 by the user can have associated properties with the interaction. For example, for each interaction with the one or more content objects 160, an amount of time of the interaction and a type of the interaction is monitored. Furthermore, for each content object 160, a number of interactions by the user with the particular content object 160 can be recorded.

In step 304, the interaction with a particular content object is determined to exceed a threshold interaction criteria. For example, the contextually-relevant content filter module 104 or the portal 204 determines when interaction by the user with the particular content object 160 exceeds a threshold interaction criteria. The interaction by the user with the particular content object 160 can be compared to differing threshold interaction criteria. In some examples, an amount of time of the interaction or a type of the interaction can be compared to respective threshold interaction criteria. In some examples, a number of interactions can be compared to a respective threshold interaction criteria.

In step 306, a list of content objects is updated with the particular content object based on the interaction. For examples, the contextually-relevant content filter module 104 or the portal 204 updates the list 185 of the content objects 160 with the particular content object 160 that includes a property (e.g., amount of type of interaction, type of interaction, number of interactions) that exceeds a respective threshold interaction criteria. The contextually-relevant content filter module 104 or the portal 204 adds the particular content object to the list 185 of the content objects 160. The updated list 185 of the content objects 160 is presented to the user through a GUI. For example, the updated list 185 of the content objects 160 is presented to the user through the GUI 113 of the mobile device 110.

In step 308, a role of the user is identified during monitored interaction of the content objects of the user interaction (e.g., step 302). For example, the contextually-relevant content filter module 104 or the portal 204 identifies a role of the user in the portal 204 during interaction by the user with the content objects 160.

In step 310, the particular content object of the content objects is determined to be associated with the identified role of the user. For example, the contextually-relevant content filter module 104 or the portal 204 determines that the particular content object 160 is associated with a role of the user. The association between the role of the user and the particular content object 160 can be based on a similar keyword or tag that each of the role of the user and the particular content object 160 is associated with.

In step 312, the list of content objects is updated with the particular content object based on the determination that the particular content object is associated with the role of the user. For example, the contextually-relevant content filter module 104 or the portal 204 updates the list 185 of the content objects 160 with the particular content object 160 (e.g., adds the particular content object 160 to the list 185 of the content objects 160) based on determining that the particular content object 160 is associated with the role of the user that is associated with the list 185 of the content objects 160.

Figure 3B:
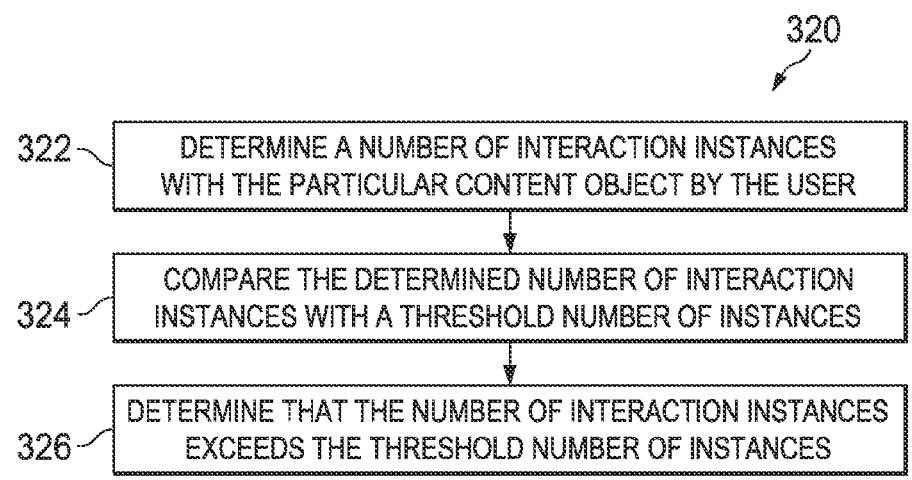

FIG. 3B illustrates an example method 320 for determining that the monitored interaction exceeds a threshold number of instances. The example method 320 can be executed, for example, by the contextually-relevant content filter module 104, using one or more computing devices. For example, any combination of the computing systems 102, 125 and the mobile device 110 can be used to execute the example process 300 and obtain any data from the memory of the mobile device 110, the computing systems 102, 125, the repository 130, and/or the clients 135.

In step 322, a number of interaction instances with the particular content object by the user is determined. For example, the contextually-relevant content filter module 104 or the portal 204 determines a number of interactions by the user with the particular content object 160. The interactions by the user can include the total interactions by the user with the particular content object 160 or a subset thereof.

In step 324, the determined number of interaction instances is compared with a threshold number of instances. For example, the contextually-relevant content filter module 104 or the portal 204 compares the number of interactions by the user with the particular content object 160 with a threshold number of instances. The number of instances that are compared to the threshold number of instances can include either the total number instances or any subset of the total number of instances.

In step 326, the number of interaction instances is determined to exceed the threshold number of instances. For example, the contextually-relevant content filter module 104 or the portal 204 determines that the number of interaction instances of a particular content object 160 exceeds the threshold number of instances.

Figure 3C:
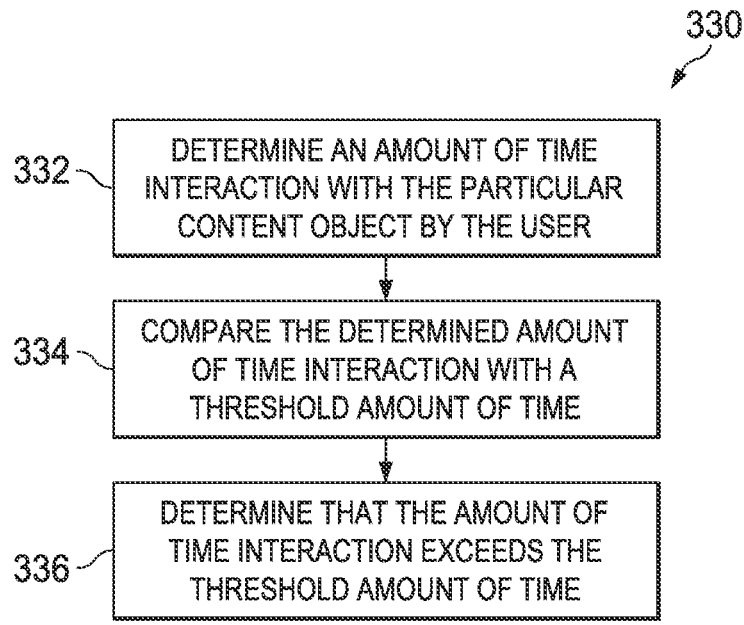

FIG. 3C illustrates an example method 330 for determining that the monitored interaction exceeds a threshold amount of time. The example method 330 can be executed, for example, by the contextually-relevant content filter module 104, using one or more computing devices. For example, any combination of the computing systems 102, 125 and the mobile device 110 can be used to execute the example process 300 and obtain any data from the memory of the mobile device 110, the computing systems 102, 125, the repository 130, and/or the clients 135.

In step 332, an amount of time interaction with the particular content object by the user is determined. For example, the contextually-relevant content filter module 104 or the portal 204 determines an amount of time of the interaction by the user with the particular content object 160. In some examples, the amount of time can be an amount of time for a particular interaction with the particular content object 160. In some examples, the amount of time for each interaction of the particular content object 160 can be summed to provide a total interaction time.

In step 334, the determined amount of time of the interaction is compared with a threshold amount of time. For example, the contextually-relevant content filter module 104 or the portal 204 compares the amount of time of the interaction by the user with the particular content object 160 with a threshold amount of time. The determined amount of time can include the amount of time for a particular interaction with the particular content object 160 or can include the total interaction time with the particular content object 160.

In step 336, the amount of time of the interaction is determined to exceed the threshold amount of time. For example, the contextually-relevant content filter module 104 or the portal 204 determines that the amount of time of the interaction with the particular content object 160 exceeds the threshold amount of time.

Figure 3D:
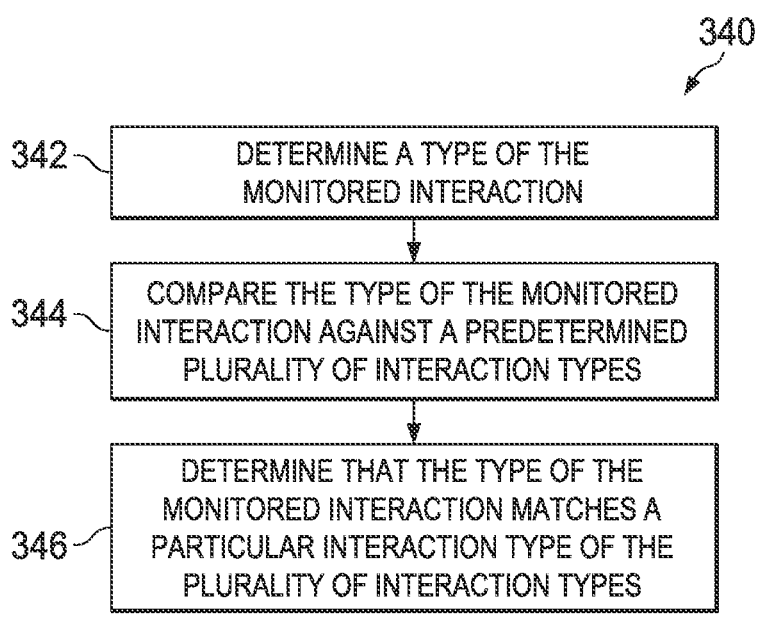

FIG. 3D illustrates an example method 340 for determining that the monitored interaction matches an interaction type. The example method 340 can be executed, for example, by the contextually-relevant content filter module 104, using one or more computing devices. For example, any combination of the computing systems 102, 125 and the mobile device 110 can be used to execute the example process 300 and obtain any data from the memory of the mobile device 110, the computing systems 102, 125, the repository 130, and/or the clients 135.

In step 342, a type of the interaction with the particular content object by the user is determined. For example, the contextually-relevant content filter module 104 or the portal 204 determines a type of the interaction by the user with the particular content object 160.

In step 344, the type of the interaction is compared against a predetermined plurality of interaction types. For example, the contextually-relevant content filter module 104 or the portal 204 compares the type of the interaction by the user with the particular content object 160 with one or more interaction types.

In step 346, the type of the interaction is determined to match a particular interaction type of the plurality of interaction types. For example, the contextually-relevant content filter module 104 or the portal 204 determines that the type of the interaction with the particular content object 160 matches a particular interaction type.

Figure 3E:
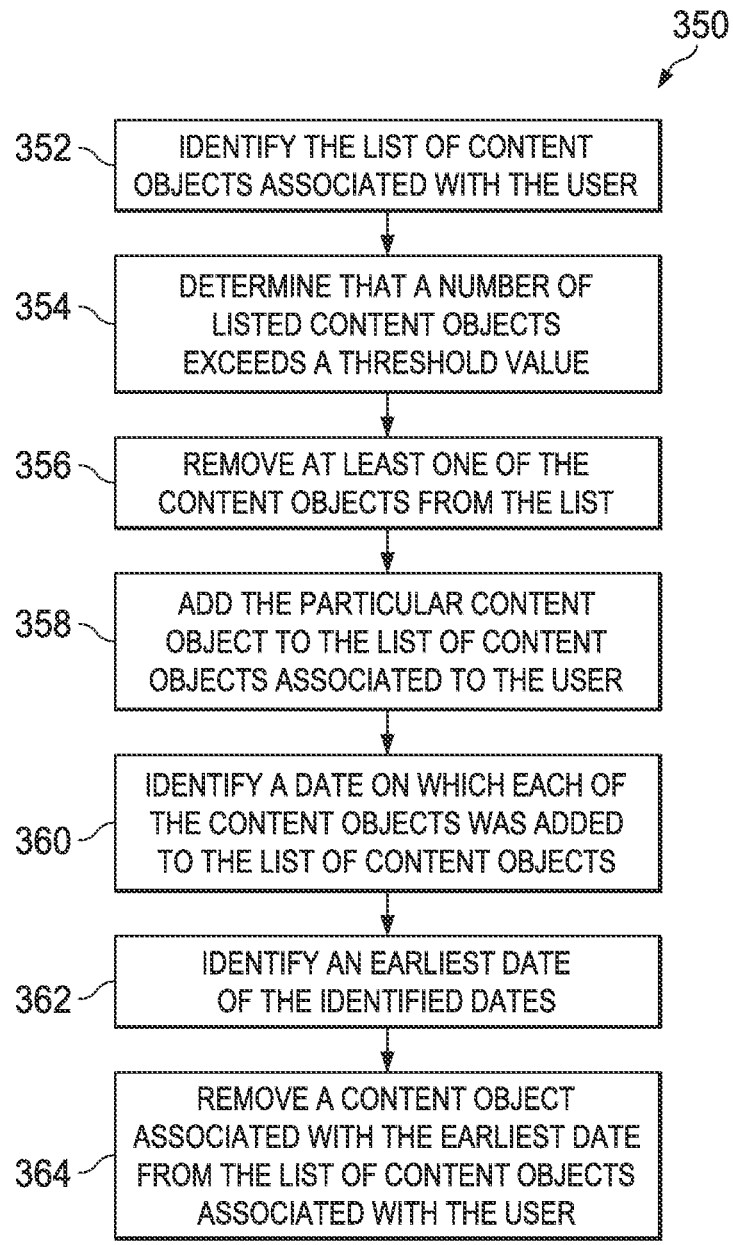

FIG. 3E illustrates an example method 350 for removing a content object from the listing of content objects. The example method 350 can be executed, for example, by the contextually-relevant content filter module 104, using one or more computing devices. For example, any combination of the computing systems 102, 125 and the mobile device 110 can be used to execute the example process 300 and obtain any data from the memory of the mobile device 110, the computing systems 102, 125, the repository 130, and/or the clients 135.

In step 352, the list of content objects associated with the user is identified. For example, the contextually-relevant content filter module 104 or the portal 204 identifies the user associated with the list 185 of the content objects 160. The list 185 of the content objects 160 can be stored by the memory 120 of the enterprise computing system 102.

In step 354, the number of listed content objects is determined to exceed a threshold value. For example, the contextually-relevant content filter module 104 or the portal 204 determines that the number of content objects 160 of the list 185 exceed a threshold value. In some examples, the threshold value associated with the list 185 of the content objects 160 can be dependent upon (or based upon) the user associated with the list 185, the specific content objects 160, or a combination thereof.

In step 356, at least one of the content objects is removed. For example, the contextually-relevant content filter module 104 or the portal 204 removes the at least one of the content object 160. In some examples, the association between the at least one content object 160 and the list 185 of the content objects 160 for the user is removed (e.g., deleted).

In step 358, the particular content object is added to the list of the content objects associated with the user. For example, the contextually-relevant content filter module 104 or the portal 204 updates the list 185 of the content objects 160 by adding the particular content object 160 to the list 185 of the content objects 160. In some examples, the list 185 of the content objects 160 associated with the user is updated to include the particular content object 160 while removing the at least one content object 160.

In step 360, a date on which each of the content objected was added to the list of content objects is identified. For example, the contextually-relevant content filter module 104 or the portal 204 identifies the date each content object 160 of the list 185 of the content objects 160 was added to the list 185.

In step 362, an earliest date of the identified dates is identified. For example, the contextually-relevant content filter module 104 or the portal 204 identifies the earliest date associated with the content objects 160 of the list 185 of (e.g., the content object 160 being the "oldest" of the content objects 160).

In step 364, a content object associated with the earliest date is removed from the list of content objects associated with the user. For example, the contextually-relevant content filter module 104 or the portal 204 removes the content object 160 having the earliest data from the list 185 of the content objects 160.

Figure 4:
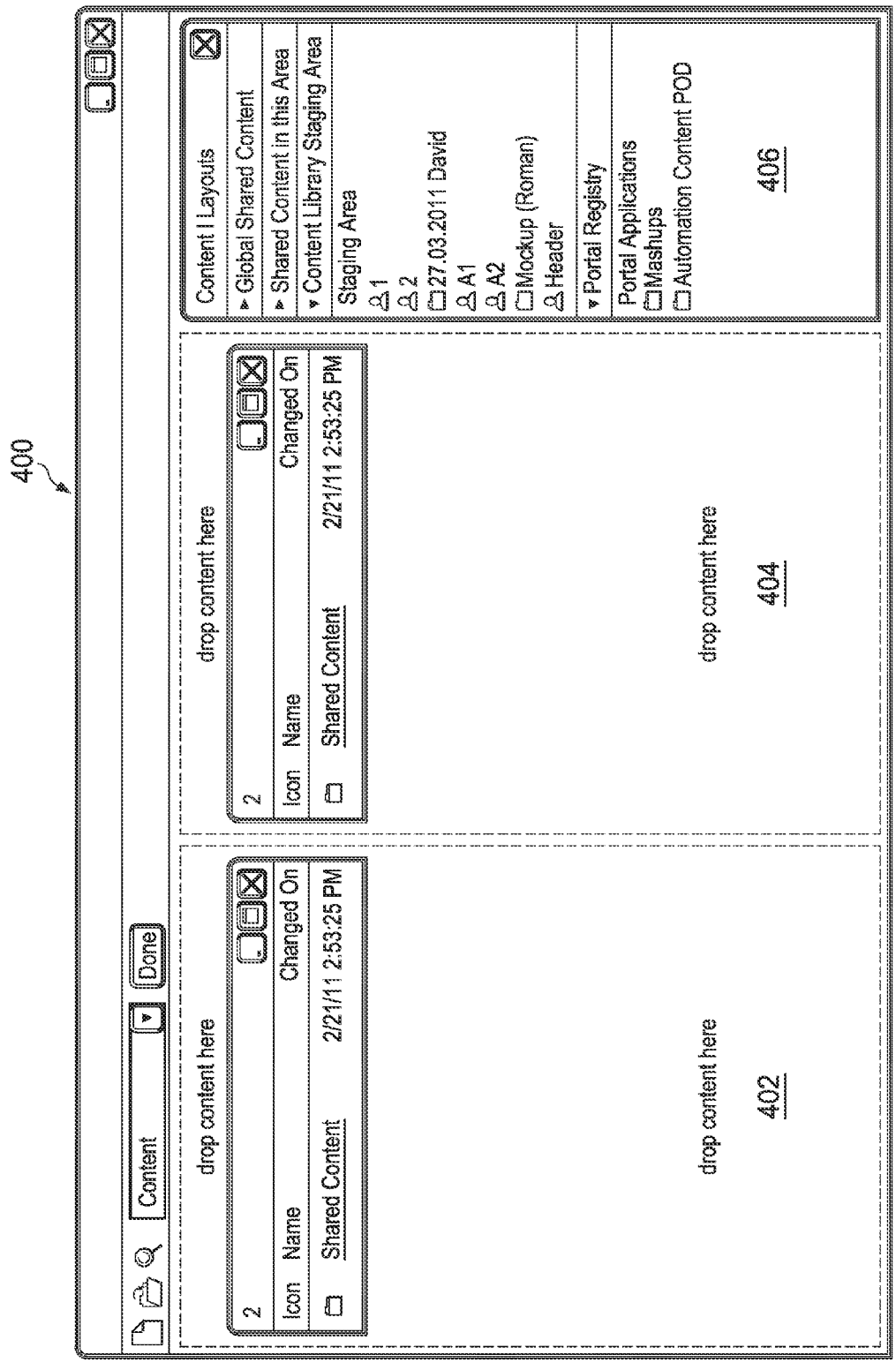
FIG. 4 illustrates an example user interface including suggested contextually-relevant content objects.

FIG. 4 illustrates an example graphical user interface (e.g., of the mobile device 110 or the clients 135) depicting contextually-relevant content presented for interaction by a user. The illustrated GUI 400 includes a first content area 402, a second content area 404, and a listing 406 of content objects. The first and the second content areas 402 and 404 provide a display of a selected content object that the user can interact with. The listing 406 includes the listing of content objects 160, as determined by the aforementioned process. A user can select one of the content objects 160 of the listing 406 of content objects and "drag" the selected content object to one of the content areas 402 and 404 such that the selected content object fills (partially or entirely) one of the content areas 402 and 404 for interaction with by the user.

A number of implementations have been described. Nevertheless, it will be understood that various modifications may be made. For example, other methods described herein besides or in addition to that illustrated in FIG. 1-4 may be performed. Further, the illustrated steps of methods 300, 320, 330, 340, and 350 may be performed in different orders, either concurrently or serially. Further, steps may be performed in addition to those illustrated in methods 300, 320, 330, 340, and 350, and some steps illustrated in methods 300, 320, 330, 340, and 350 may be omitted without deviating from the present disclosure. Accordingly, other implementations are within the scope of the following claims.

What is claimed is:

1. A computer-implemented method for providing contextually-relevant content, the method comprising:
monitoring, by a computing processor, interaction by a user with a plurality of content objects accessed through a portal, at least a portion of the plurality of content objects presented to the user in a list through a graphical user interface (GUI);
determining, by the computing processor, that a particular content object of the plurality of content objects is associated with a role of one or more roles of the user within the portal, each of the one or more roles defining a user position of the user with an organization structure of a business enterprise within the portal, the portal comprising a single point of access to the plurality of content objects that include one or more first content objects associated with the one or more roles of the user and one or more second content objects exclusive of the one or more roles of the user, the determination comprising:
identifying one or more first keywords associated with the one or more roles of the user within the portal, and one or more second keywords associated with one or more of the plurality of content objects that are accessed through the portal by the user;
evaluating, with the computing processor, the one or more first keywords and the one or more second keywords to identify a particular keyword that is one of both the first keywords and one of the second keywords; and determining, by the computing processor, that the particular content object is associated with the particular keyword;

identifying, by the computing processor, a type of the interaction by the user with the particular content object from two or more types of interactions;

in response to identifying the type of the interaction, identifying a type-based interaction criteria associated with the identified type of the interaction, wherein each type of interaction of the two or more types of interactions is associated with a differing type-based interaction criteria;

in response to identifying the type-based interaction criteria, identifying a threshold interaction criteria associated with the type-based interaction criteria that is based on the particular content object;

performing a comparison to determine, by the computing processor, that the interaction with the particular content object of the plurality of content objects by the user exceeds the identified threshold interaction criteria;

based on the comparison, updating, by the computing processor, the list of content objects presented to the user through the GUI to include the particular content object in the list based, at least in part, on (i) the interaction with the particular content object exceeding the identified threshold interaction criteria and (ii) the particular content object being associated with the role of the user within the portal; and displaying, by the computing processor, the updated list through the GUI.

2. The method of claim 1, wherein the monitored interaction comprises at least one of:
editing one or more properties of the particular content object;
editing a look and feel of the particular content object;
editing metadata of the particular content object;
setting a permission of the particular content object; or
editing a structure of the particular content object.

3. The method of claim 1, wherein the step of determining that the interaction with the particular content object of the plurality of content objects by the user exceeds the identified threshold interaction criteria comprises:
determining a number of interaction instances with the particular content object by the user;
comparing the determined number of interaction instances with a threshold number of instances; and
determining that the number of interaction instances exceeds the threshold number of instances.

4. The method of claim 1, wherein the step of determining that the interaction with the particular content object of the plurality of content objects by the user exceeds the identified threshold interaction criteria comprises:
determining an amount of time interaction with the particular content object by the user;
comparing the determined amount of time interaction with a threshold amount of time; and
determining that the amount of time interaction exceeds the threshold amount of time.

5. The method of claim 1, wherein the step of determining that the interaction with the particular content object of the plurality of content objects by the user exceeds the identified threshold interaction criteria further comprises:
determining a type of the monitored interaction;
comparing the type of the monitored interaction against a predetermined plurality of interaction types; and
determining that the type of the monitored interaction matches a particular interaction type of the plurality of interaction types.

6. The method of claim 1, wherein updating the list of content objects presented to the user through the GUI to include the particular content object in the list comprises:
identifying the list of content objects associated with the user;
determining that a number of listed content objects exceeds a threshold value;
removing at least one of the content objects from the list; and
subsequent to removing the at least one content object, adding the particular content object to the list of content objects associated with the user.

7. The method of claim 6, further comprising:
identifying a date on which each of the content objects was added to the list of content objects;
identifying an earliest date of the identified dates;
removing a content object associated with the earliest date from the list of content objects associated with the user.

8. The method of claim 1, further comprising:
identifying the role of the user in the portal during the monitored interaction of the plurality of content objects.

9. The method of claim 1, wherein identifying the one or more first keywords associated with the role of the user further comprises:
identifying a user profile associated with the user;
identifying the role of the user that is included by the user profile; and
identifying the one or more first keywords that are associated with the role of the user that is included by the user profile.

10. The method of claim 9, wherein identifying the one or more first keywords associated with the role of the user further comprises: identifying the one or more first keywords that are associated with a job-related position of the user within the organization that is defined by the portal.

11. The method of claim 1, wherein the plurality of content objects are presented to the user on a tile-based interface of the GUI, each content object represented as a graphical tile, the method further comprising:
updating the tile-based interface that is displayed through the GUI to include the particular content object, the particular content object represented as a graphical tile.

12. A non-transitory computer storage medium encoded with a computer program, the program comprising instructions that when executed by one or more computers cause the one or more computers to perform operations comprising:
monitoring interaction by a user with a plurality of content objects accessed through a portal, at least a portion of the plurality of content objects presented to the user in a list through a graphical user interface (GUI);
determining that a particular content object of the plurality of content objects is associated with a role of one or more roles of the user within the portal, each of the one or more roles defining a user position of the user with an organization structure of a business enterprise within the portal, the portal comprising a single point of access to the plurality of content objects that include one or more first content objects associated with the one or more roles of the user and one or more second content objects exclusive of the one or more roles of the user, the determination comprising:
identifying one or more first keywords associated with the one or more roles of the user within the portal, and one or more second keywords associated with one or more of the plurality of content objects that are accessed through the portal by the user;

evaluating, with a computing processor, the one or more first keywords and the one or more second keywords to identify a particular keyword that is one of both the first keywords and one of the second keywords; and determining, by the computing processor, that the particular content object is associated with the particular keyword;

identifying, by the computing processor, a type of the interaction by the user with the particular content object from two or more types of interactions;

in response to identifying the type of the interaction, identifying a type-based interaction criteria associated with the identified type of the interaction, wherein each type of interaction of the two or more types of interactions is associated with a differing type-based interaction criteria;

in response to identifying the type-based interaction criteria, identifying a threshold interaction criteria associated with the type-based interaction criteria that is based on the particular content object;

performing a comparison to determine, by the computing processor, that the interaction with the particular content object of the plurality of content objects by the user exceeds the identified threshold interaction criteria;

based on the comparison, updating, by the computing processor, the list of content objects presented to the user through the GUI to include the particular content object in the list based, at least in part, on (i) the interaction with the particular content object exceeding the identified threshold interaction criteria and (ii) the particular content object being associated with the role of the user within the portal; and displaying the updated list through the GUI.

13. The non-transitory computer storage medium of claim 12, wherein the operation of determining that the interaction with the particular content object of the plurality of content objects by the user exceeds the identified threshold interaction criteria comprises:

determining a number of interaction instances with the particular content object by the user;

comparing the determined number of interaction instances with a threshold number of instances; and determining that the number of interaction instances exceeds the threshold number of instances.

14. The non-transitory computer storage medium of claim 12, wherein the operation of determining that the interaction with the particular content object of the plurality of content objects by the user exceeds the identified threshold interaction criteria comprises:

determining an amount of time interaction with the particular content object by the user;

comparing the determined amount of time interaction with a threshold amount of time; and determining that the amount of time interaction exceeds the threshold amount of time.

15. The non-transitory computer storage medium of claim 12, wherein the operation of determining that the interaction with the particular content object of the plurality of content objects by the user exceeds the identified threshold interaction criteria further comprises:

determining a type of the monitored interaction;

comparing the type of the monitored interaction against a predetermined plurality of interaction types; and determining that the type of the monitored interaction matches a particular interaction type of the plurality of interaction types.

16. The non-transitory computer storage medium of claim 12, wherein the operation of updating the list of content objects presented to the user through the GUI to include the particular content object in the list comprises:

identifying the list of content objects associated with the user;

determining that a number of listed content objects exceeds a threshold value;

removing at least one of the content objects from the list; and subsequent to removing the at least one content object, adding the particular content object to the list of content objects associated with the user.

17. The non-transitory computer storage medium of claim 16, wherein the operations further comprise:

identifying a date on which each of the content objects was added to the list of content objects;

identifying an earliest date of the identified dates;

removing a content object associated with the earliest date from the list of content objects associated with the user.

18. The non-transitory computer storage medium of claim 12, wherein the operations further comprise:

identifying the role of the user in the portal during the monitored interaction of the plurality of content objects.

19. A computing system comprising one or more memory modules, one or more hardware processors, and instructions stored on one or more of the memory modules and operable when executed with the one or more processors to perform operations comprising:

monitoring interaction by a user with a plurality of content objects accessed through a portal, at least a portion of the plurality of content objects presented to the user in a list through a graphical user interface (GUI);

determining that a particular content object of the plurality of content objects is associated with a role of one or more roles of the user within the portal, each of the one or more roles defining a user position of the user with an organization structure of a business enterprise within the portal, the portal comprising a single point of access to the plurality of content objects that include one or more first content objects associated with the one or more roles of the user and one or more second content objects exclusive of the one or more roles of the user, the determination comprising:

identifying one or more first keywords associated with the one or more roles of the user within the portal, and one or more second keywords associated with one or more of the plurality of content objects that are accessed through the portal by the user;

evaluating, with the one or more hardware processors, the one or more first keywords and the one or more second keywords to identify a particular keyword that is one of both the first keywords and one of the second keywords; and determining, by the one or more hardware processors, that the particular content object is associated with the particular keyword;

identifying, by the one or more hardware processors, a type of the interaction by the user with the particular content object from two or more types of interactions;

in response to identifying the type of the interaction, identifying a type-based interaction criteria associated with the identified type of the interaction, wherein each type of interaction of the two or more types of interactions is associated with a differing type-based interaction criteria;

in response to identifying the type-based interaction criteria, identifying a threshold interaction criteria associated with the type-based interaction criteria that is based on the particular content object;

performing a comparison to determine, by the one or more hardware processors, that the interaction with the particular content object of the plurality of content objects by the user exceeds the identified threshold interaction criteria;

based on the comparison, updating, by the one or more hardware processors, the list of content objects presented to the user through the GUI to include the particular content object in the list based, at least in part, on (i) the interaction with the particular content object exceeding the identified threshold interaction criteria and (ii) the particular content object being associated with the role of the user within the portal; and displaying the updated list through the GUI.

20. The computing system of claim 19, wherein the operation of determining that the interaction with the particular content object of the plurality of content objects by the user exceeds the identified threshold interaction criteria comprises:

determining a number of interaction instances with the particular content object by the user;

comparing the determined number of interaction instances with a threshold number of instances; and determining that the number of interaction instances exceeds the threshold number of instances.

21. The computing system of claim 19, wherein the operation of determining that the interaction with the particular content object of the plurality of content objects by the user exceeds the identified threshold interaction criteria comprises:

determining an amount of time interaction with the particular content object by the user;

comparing the determined amount of time interaction with a threshold amount of time; and determining that the amount of time interaction exceeds the threshold amount of time.

22. The computing system of claim 19, wherein the operation of determining that the interaction with the particular content object of the plurality of content objects by the user exceeds the identified threshold interaction criteria further comprises:

determining a type of the monitored interaction;

comparing the type of the monitored interaction against a predetermined plurality of interaction types; and determining that the type of the monitored interaction matches a particular interaction type of the plurality of interaction types.

23. The computing system of claim 19, wherein the operation of updating the list of content objects presented to the user through the GUI to include the particular content object in the list comprises:

identifying the list of content objects associated with the user;

determining that a number of listed content objects exceeds a threshold value;

removing at least one of the content objects from the list; and subsequent to removing the at least one content object, adding the particular content object to the list of content objects associated with the user.

24. The computing system of claim 23, wherein the operations further comprise:

identifying a date on which each of the content objects was added to the list of content objects;

identifying an earliest date of the identified dates;

removing a content object associated with the earliest date from the list of content objects associated with the user.

* * * * *